United States Patent [19]

Zucker

[11] Patent Number: 5,303,296
[45] Date of Patent: Apr. 12, 1994

[54] TELEPHONE SYSTEM

[76] Inventor: JoAnn Zucker, Tomkins Dr. P.O. Box 228, Tomkins Cove, N.Y. 10986

[21] Appl. No.: 390

[22] Filed: Jan. 4, 1993

[51] Int. Cl.$^5$ .......................................... H04M 1/64
[52] U.S. Cl. ...................................... 379/67; 379/84; 379/201
[58] Field of Search .................. 379/88, 89, 67, 84, 379/213, 214, 93, 96-98, 201; 370/61

[56] References Cited

U.S. PATENT DOCUMENTS

| | | |
|---|---|---|
| 4,476,349 | 10/1984 | Cottrell . |
| 4,602,129 | 7/1988 | Matthews . |
| 4,805,207 | 2/1989 | McNutt . |
| 4,935,956 | 6/1990 | Hellwarth et al. ............... 379/201 |
| 4,972,462 | 11/1990 | Shibata . |
| 5,003,577 | 3/1991 | Ertz . |
| 5,008,926 | 4/1991 | Misholi . |
| 5,033,077 | 7/1991 | Bergeron et al. .................. 379/89 |
| 5,099,509 | 3/1992 | Morganstein . |
| 5,118,429 | 5/1992 | Morley, Jr. . |
| 5,146,487 | 9/1992 | Bergsman . |
| 5,163,085 | 11/1992 | Sweet et al. ....................... 379/89 |

Primary Examiner—Wing F. Chan
Attorney, Agent, or Firm—Stnaley J. Yavner

[57] ABSTRACT

A method for using a telephone system, in order to replace the use of existing mail systems, for sending out certified or registered information. The receipt of such information is acknowledged and responded to by use of this method. The method involves initiating the call, recording the substance of certified or registered information, prompting a pre-recorded announcement as soon as the communication is made in order to advise the recipient that the call is being recorded along with the time and date of the call. After the announcement, the pre-recorded information is transmitted, a record is made of the response, if any, and a full record, including time and date is sent to the initiator of the call. Alternatively, the "certified" information is spoken by the initiator, rather than being pre-recorded. In either event, a record of the telephone numbers of the initiator and the recipient are recorded and printed out for transmission to the initiator along with the time and date of the call, and the fact that the connection was made. Additionally, the record provided to the initiator has the full contents of the "conversation", including the announcement, the intitiator's words or the prerecorded information, as well as the data mentioned above.

5 Claims, 2 Drawing Sheets

TELEPHONE SYSTEM

FIELD OF THE INVENTION

This invention relates primarily to telephone systems for replacing mail service, and more particularly to a method for use of standard telephone equipment in order to provide the full range of value enabled by a certified mailing.

DESCRIPTION OF THE PRIOR ART AND BACKGROUND OF THE INVENTION

Often, business, government and the general public requires the use of a mailing system to provide certified or registered information. For instance, an attorney requires the use of registered or certified mail in order to provide written notice and the recording of the receipt and contents of that notice, with respect to an event or events that may occur under certain conditions or circumstances. As an example, an attorney wants an opposing party to cease and desist from certain activities affecting the attorney's client. Presuming that the law enables the collection of damages in a lawsuit following the notice only from the date such notice is given, a record that the opposing party received the notice, a record of the time and date of the notice, a record showing that the correct address (phone number) of the recipient of the notice was used and a record of the response to the notice, if any, is critical in evaluating damages owing to the attorney's client at the conclusion of the law suit.

Existing phone equipment and technology, in total, is capable of providing the steps of the method envisioned by this invention, but would need arranging and alternative use in order to provide the sequence, billing, record and accomplishment of objectives contemplated by the present invention. Also, it is probably important to have a record that the recipient was advised at the outset that the entire call was being recorded.

For instance, U.S. Pat. No. 5,146,487 to Bergsman discloses a method for use in connection with a voice mail system in order to deliver a message to a particular person at a particular time. Bergsman uses pre-programmed prompts to initiate various steps of his method, but does not use the steps of recording and delivering and specifying of the circumstances of the message sufficient to anticipate the present invention.

U.S. Pat. No. 5,008,926 to Misholi discloses apparatus for producing a message, as well as notification means and recording means for the message. The Misholi system provides a disclosure of apparatus that is useful in the method of the present invention, but does not anticipate the overall objectives and functioning of the system as disclosed herein. The Ertz patent (U.S. Pat. No. 5,003,577 warrants the same comments as Misholi above. These patents plus the following are useful only in disclosing apparatus useful in the present method, but none anticipate a combination with others, or the method as contemplated herein:

| U.S. Pat. No. | Inventor |
|---|---|
| 5,113,429 | Morley, Jr. |
| 4,602,129 | Matthews |
| 4,972,462 | Shibata |
| 5,009,509 | Morganstein |
| 4,805,207 | McNutt |
| 4,853,952 | Jackmann |

-continued

| U.S. Pat. No. | Inventor |
|---|---|
| 4,476,349 | Cottrell |

OBJECTS AND SUMMARY OF THE INVENTION

Accordingly, a primary object of the present invention is to provide a method for using existing telephone apparatus and technology, but in an arrangement to enable the sending of electronic certified or registered transmissions instead of the use of mailing systems for such purposes.

A further and more particular object is to provide the steps of a telephone "certified" or "registered" transmission system, which enables the recipient of the call to be notified initially that the call is being recorded, to enable the name and address of the recipient to be recorded along with the time and date of the call and the contents of the call itself.

A further and more specific object of the present invention is to enable the transmission of the record to the initiator of the call, and any response which occurs in the same transaction (single phone call), along with a billing for same.

These and other objects of the present invention are provided in an invention method which features the steps of dialing a predetermined exchange, as an example, a 700 prefix, plus the initiator's area code and phone number. Such dialing thereafter initiates the activation of various state-of-the-art telephone equipment to cause a communication to be made, verification of the recipient's name and address, the beginning of a recording at the location of the aforementioned telephone system and the beginning of an announcement to the recipient that the call and all of its circumstances and the names of the participants were being recorded. In fact, the call is then recorded and a printout of the record made, to be sent with a billing to the initiator.

BRIEF DESCRIPTION OF THE DRAWINGS

Other objects, features and advantages of the present invention will become apparent by the following detailed description of the preferred, but nonetheless illustrative, embodiment, with reference to the accompanying drawings wherein.

DETAILED DESCRIPTION OF THE PREFERRED EMBODIMENT

This invention is a form of what is commonly called "certified mail" but without using the facilities of the United States or any other postal services. Specifically, the method disclosed herein and claimed herein is much faster and more all-encompassing, in terms of record and certainty, than would be accomplished by any method relying upon only written information, confirmations and other detail.

Figure 1:
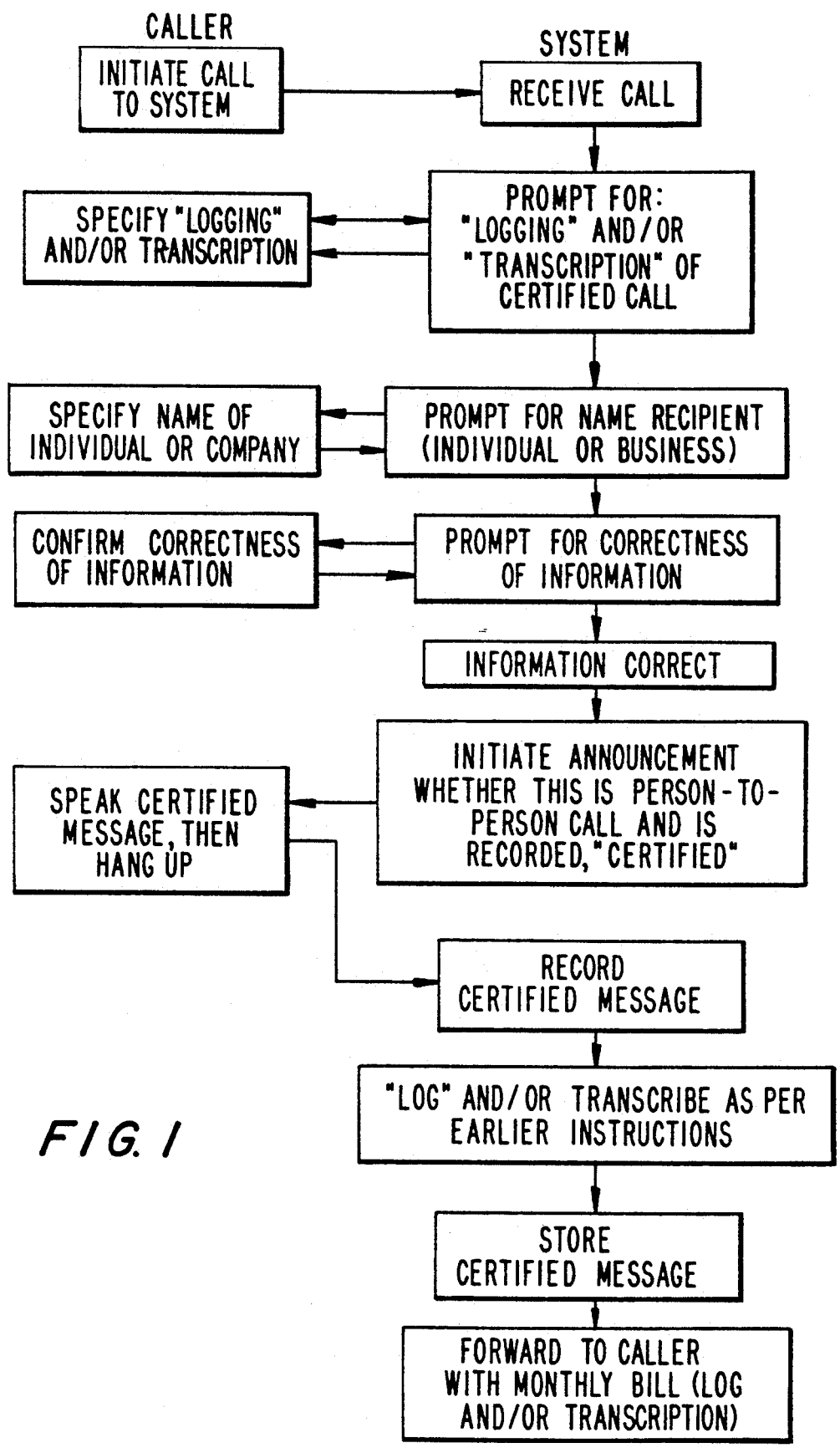
FIG. 1 is a flow chart indicting the steps of the method of the present invention.
Figure 2:
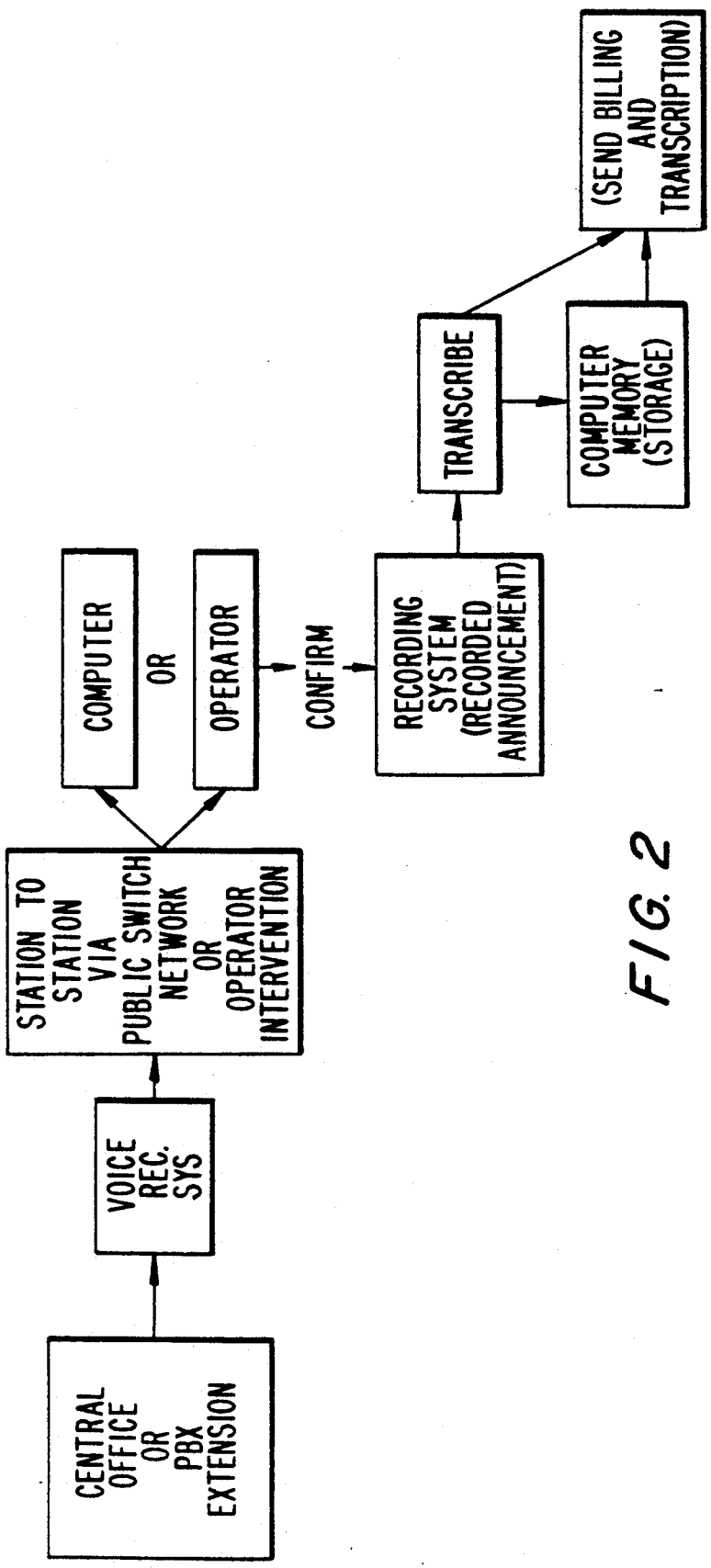
FIG. 2 is a logical representation, indicating by a block diagram the details of the system necessary to carry out the method of this invention.

Referring to the drawings, the steps of the method according to the present invention are detailed, under the columns "CALLER" and "SYSTEM" in FIG. 1. FIG. 2 shows, in block diagram form, the equipment or logical system which would carry out the steps of the method as are disclosed herein.

Referring to the drawings, the method is initiated by use of a dedicated or other telephone prefix, such as "700". This connects the initiator with a specific central office or PBX extension, which reviews the call, and the initiator or caller specifies that he or she would prefer "logging" only or "logging" and transcription of all aspects and data relating to the call. For the purposes of this application, "logging" is defined as making a record at the telephone company facilities that a specific caller made a call from a specific telephone number to a specific recipient at a specific telephone number for that recipient, as well as the time, date, length of, etc. relating to the call. If transcription is also requested, the system or the operator begins a voice record by means of computer peripheral equipment and/or presently available recording equipment. Still further, the requesting of a transcription permits the operator, and/or equipment automatically to permit and thereby initiate an announcement to the recipient, immediately after identification, that all aspects and contents of the call are being recorded.

In further detail, the caller would probably, but not necessarily, have a text pre-prepared when making the call, in order to properly deliver the certified message. The pre-prepared text would be announced by the caller, and an opportunity would be given to the recipient to respond. Immediately thereafter, the caller would have the opportunity to announce the termination of the call, after which "logging" and/or transcription would be sent or transmitted to a storage facility, such as a computer memory, in any form that would accept the input of the recorded call, if any, and the log of the data relating to the certified message. Also, a transcription of the entire log and/or transcription, both in transcribed form, is filed away for submission to the caller with regular billing; or preferably, sent to the caller immediately with a billing, after a delay following the call of up to one month for that transaction.

The foregoing thereby represents the method of this invention, which eliminates from its details only the various checks, which would be used to confirm or correct at various steps or stages. For instance, the designation by the initiator or caller of his or her own telephone number can and probably would be checked for correctness at the telephone company. Furthermore, the designation of the name and business and phone number of the proposed recipient, as announced by the caller at the time of initiating the call, would be checked with the caller, for instance, in terms of spelling and correctness of the information. This is done, whether or not the call is primarily handled with operator assistance or by use of automatic equipment.

Referring particularly to FIG. 2, the equipment used to carry out the steps of the method is shown in block diagram form, as including a central office or PBX extension, a voice recording system, equipment for automatic station-to-station equipment and/or operator intervention. Of course, presently available computer equipment is used, either as a back-up, with operator assistance capability, or in place thereof. The computer is particularly useful in providing automatic billing along with a log and/or a transcription, and it is contemplated by the present invention that one or more recording systems, by tape, disk or the like, is used within the bounds of the present method invention.

In its broadest form, the method of the present invention includes the steps of the caller initiating the substance of the call to begin the certified calling system and method, by either simply stating his or her purpose to an operator, or by use of automatic dialing and/or exchange equipment. In either event, either "logging" or by use of logging and transcription together, the initiator chooses whether or not only the official data, as previously described, will be recorded and transcribed, or whether such data will be recorded and transcribed along with a record of all contents of the transaction. Continuing with the steps of the method, various checks are made to confirm correctness of the information provided by the caller, after which an announcement is provided as soon as a connection is made and the recipient is properly identified and confirmed. Such an announcement, probably in pre-recorded form in the telephone equipment itself, indicates to the recipient not only that a full record is being made of the call, but also that a record is made that the proper and intended recipient has been identified and confirmed before such an announcement was made. Thus, an incentive is provided to the recipient to carefully consider the futility of either a refusal to allow the record, or a refusal to continue the transaction.

Presuming the acceptance of the call, the proper records and logs, as warranted, are made and transcribed for providing to the caller a full and complete record of, not only whether an attempt was made to place and complete the call, but also whether or not the attempt was successful.

Relating the foregoing to an actual situation, in order to provide a full and complete description of the present invention, it is submitted that a typical reason for use of this method relates to an attorney providing notice to a potential adversary that the continuation of alleged wrongful activity has been noted and would be dealt with, for instance in a law suit, if the activity should continue. Of course, non-lawyers, in certain circumstances, provide the same or similar notice under various circumstances.

It probably is important in either event that a record be made by an independent party (in this case, the telephone company), that an attempt was made to provide such notice. It is, of course, even more valuable to have such an independent record (billing and transcription and log) that the attempt was successful, and the exact terminology used to provide the notice. It is even more valuable to record, by use of such independent means, whether or not the recipient answered the call and/or responded in any manner during the call.

In all events, the foregoing is intended to provide, along with the drawings, a full and complete description of the present invention; but the invention itself, as a novel method, is to be limited only by the following claims:

What is claimed is:

1. A method for transmitting certified information by means of a telephone system from a caller to a recipient, comprising the steps of:
   (a) the caller initiating the call by describing its nature as a certified call, providing the name, business, if any, and telephone number of the recipient, and indicating the name, business, if any, and phone number of the caller;
   (b) the caller specifying whether or not a transcription should be made of the contents of the call;

(c) the caller and said system exchanging information as to whether or not the information provided is correct;
(d) the system providing an announcement to the recipient that the call is a certified call, that the call is being logged and whether or not the contents of the call are being recorded;
(e) the caller speaking the certified message;
(f) the system recording said message;
(g) the system transcribing the log of the call and providing a transcription of its contents if the instruction to do so has been provided by the caller in step (b);
(h) the system storing the message; and
(i) the system providing all transcriptions to the caller with billing information.

2. The method of claim 1 comprising the additional step of the system enabling the recipient to respond immediately after step (e), and the addition to step (f) of the system recording said response.

3. The invention according to claim 1. wherein the method comprises providing the delay of up to one month between steps (g) and (i) thereof.

4. The invention according to claim 1. wherein the method comprises the additional step of the system connecting the recipient with the caller between steps (c) and (d) thereof.

5. The invention according to claim 4. wherein the method comprises the additional step of the system and the recipient exchanging information as to whether or not the recipient's name, business, if any, and telephone number are correct, as provided by the caller, and as connected by the system.

* * * * *